(12) United States Patent  
Bandyopadhyay et al.

(10) Patent No.: US 9,355,239 B2  
(45) Date of Patent: *May 31, 2016

(54) IMAGE-BASED UNLOCK FUNCTIONALITY ON A COMPUTING DEVICE

(71) Applicant: Microsoft Technology Licensing, LLC, Redmond, WA (US)

(72) Inventors: Shamik Bandyopadhyay, Lake Stevens, WA (US); Veronica Y. Law, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/890,019

(22) Filed: May 8, 2013

(65) Prior Publication Data

US 2013/0247171 A1    Sep. 19, 2013

Related U.S. Application Data

(62) Division of application No. 12/485,952, filed on Jun. 17, 2009, now Pat. No. 8,458,485.

(51) Int. Cl.
*G06F 21/00* (2013.01)
*G06F 21/36* (2013.01)
*G06F 21/31* (2013.01)

(52) U.S. Cl.
CPC .............. *G06F 21/36* (2013.01); *G06F 21/316* (2013.01); *G06F 2221/2105* (2013.01); *G06F 2221/2141* (2013.01); *G06F 2221/2147* (2013.01)

(58) Field of Classification Search
CPC . G06F 21/36; G06F 2221/2117; G06F 21/31; G06F 21/32; H04W 12/06; H04L 63/0861; H04L 63/083; H04L 63/08; G06Q 20/3274
USPC ............................................ 713/182; 726/17
See application file for complete search history.

(56) References Cited

U.S. PATENT DOCUMENTS 5,224,179 A    6/1993    Denker et al.
5,465,084 A    11/1995   Cottrell (Continued)

FOREIGN PATENT DOCUMENTS

CN    1957355    5/2007
CN    101371258  2/2009

(Continued)

OTHER PUBLICATIONS

"Notice of Allowance", U.S. Appl. No. 13/163,201, (Sep. 24, 2013),16 pages.

(Continued)

*Primary Examiner* — Ali Abyaneh
(74) *Attorney, Agent, or Firm* — Judy Yee; Micky Minhas (57) ABSTRACT

Utilizing an image on a computing device to serve as a template for locking/unlocking the computing device. The image includes a plurality of portions that are defined and thereafter identified and presented to a user via a touch screen. A user selects portions/zones that are defined within the image in a specified sequence and this sequence is stored as a lock/unlock code for unlocking the computing device. In an embodiment, in addition to the specified sequence of selections, a movement or sequence of movements may be also be stored as part of the lock/unlock code.

20 Claims, 6 Drawing Sheets

(56) References Cited

U.S. PATENT DOCUMENTS

| | | | |
|---|---|---|---|
| 5,485,531 A | 1/1996 | Ichinohe et al. | |
| 5,539,840 A | 7/1996 | Krtolica et al. | |
| 5,559,961 A * | 9/1996 | Blonder | 726/18 |
| 5,608,387 A | 3/1997 | Davies | |
| 5,778,069 A | 7/1998 | Thomlinson et al. | |
| 6,075,905 A | 6/2000 | Herman | |
| 6,118,872 A | 9/2000 | Kashima et al. | |
| 6,185,316 B1 | 2/2001 | Buffam | |
| 6,209,104 B1 | 3/2001 | Jalili | |
| 6,278,453 B1 | 8/2001 | Bodnar | |
| 6,393,305 B1 | 5/2002 | Ulvinen et al. | |
| 6,516,092 B1 | 2/2003 | Bachelder et al. | |
| 6,718,471 B1 * | 4/2004 | Kashima | 726/9 |
| 6,720,860 B1 | 4/2004 | Narayanaswami | |
| 6,788,304 B1 | 9/2004 | Hart et al. | |
| 6,868,190 B1 | 3/2005 | Morton | |
| 6,934,860 B1 | 8/2005 | Goldstein | |
| 6,948,068 B2 | 9/2005 | Lawandy et al. | |
| 6,958,759 B2 | 10/2005 | Safadi et al. | |
| 6,959,394 B1 | 10/2005 | Brickell et al. | |
| 7,219,368 B2 | 5/2007 | Juels et al. | |
| 7,240,367 B2 | 7/2007 | Park | |
| 7,243,239 B2 | 7/2007 | Kirovski et al. | |
| 7,257,241 B2 | 8/2007 | Lo | |
| 7,279,646 B2 | 10/2007 | Xu | |
| 7,383,570 B2 | 6/2008 | Pinkas et al. | |
| 7,536,556 B2 | 5/2009 | Fedorova et al. | |
| 7,593,000 B1 | 9/2009 | Chin | |
| 7,657,849 B2 | 2/2010 | Chaudhri et al. | |
| 7,734,930 B2 | 6/2010 | Kirovski et al. | |
| 7,743,256 B2 | 6/2010 | Yang | |
| 7,793,108 B2 | 9/2010 | Narayanaswami et al. | |
| 7,831,294 B2 | 11/2010 | Viswanathan | |
| 7,873,382 B2 * | 1/2011 | Rydgren et al. | 455/550.1 |
| 7,941,834 B2 | 5/2011 | Beck et al. | |
| 7,953,983 B2 * | 5/2011 | Holt et al. | 713/186 |
| 7,970,240 B1 | 6/2011 | Chao et al. | |
| 8,024,775 B2 | 9/2011 | Xu et al. | |
| 8,286,102 B1 | 10/2012 | Wilensky | |
| 8,458,485 B2 | 6/2013 | Bandyopadhyay et al. | |
| 8,504,842 B1 | 8/2013 | Meacham | |
| RE44,725 E | 1/2014 | Holt et al. | |
| 8,650,636 B2 | 2/2014 | Johnson et al. | |
| 8,782,775 B2 * | 7/2014 | Fadell et al. | 726/16 |
| 8,910,253 B2 | 12/2014 | Johnson et al. | |
| 2001/0037468 A1 | 11/2001 | Gaddis | |
| 2001/0044906 A1 | 11/2001 | Kanevsky et al. | |
| 2002/0029341 A1 | 3/2002 | Juels et al. | |
| 2003/0086609 A1 * | 5/2003 | Gangadhar | 382/181 |
| 2003/0093699 A1 | 5/2003 | Banning et al. | |
| 2003/0128396 A1 | 7/2003 | Fan | |
| 2004/0010722 A1 | 1/2004 | Ha | |
| 2004/0034801 A1 | 2/2004 | Jaeger | |
| 2004/0155991 A1 | 8/2004 | Lowles et al. | |
| 2004/0169638 A1 | 9/2004 | Kaplan | |
| 2004/0193882 A1 | 9/2004 | Singerle | |
| 2004/0230843 A1 | 11/2004 | Jansen | |
| 2004/0260955 A1 | 12/2004 | Mantyla | |
| 2005/0141747 A1 | 6/2005 | Shi et al. | |
| 2005/0210417 A1 | 9/2005 | Marvit et al. | |
| 2005/0210418 A1 | 9/2005 | Marvit et al. | |
| 2006/0010400 A1 | 1/2006 | Dehlin et al. | |
| 2006/0174339 A1 | 8/2006 | Tao | |
| 2006/0206717 A1 | 9/2006 | Holt et al. | |
| 2006/0206918 A1 | 9/2006 | McLean | |
| 2007/0016958 A1 * | 1/2007 | Bodepudi et al. | 726/27 |
| 2007/0047772 A1 | 3/2007 | Matey et al. | |
| 2007/0071285 A1 | 3/2007 | Kontsevich | |
| 2007/0115091 A1 * | 5/2007 | Bandaru | 340/5.8 |
| 2007/0150842 A1 | 6/2007 | Chaudhri et al. | |
| 2007/0277224 A1 | 11/2007 | Osborn | |
| 2008/0230598 A1 | 9/2008 | Bodin | |
| 2008/0244013 A1 | 10/2008 | Kropivny | |
| 2008/0244700 A1 | 10/2008 | Osborn et al. | |
| 2008/0263361 A1 | 10/2008 | Dutta et al. | |
| 2009/0038006 A1 | 2/2009 | Traenkenschuh et al. | |
| 2009/0055910 A1 * | 2/2009 | Lee | 726/6 |
| 2009/0083847 A1 | 3/2009 | Fadell et al. | |
| 2009/0085936 A1 | 4/2009 | Chen et al. | |
| 2009/0094247 A1 | 4/2009 | Fredlund et al. | |
| 2009/0138725 A1 | 5/2009 | Madhvanath et al. | |
| 2009/0172810 A1 | 7/2009 | Won et al. | |
| 2009/0199295 A1 * | 8/2009 | Shih et al. | 726/18 |
| 2009/0210939 A1 | 8/2009 | Xu et al. | |
| 2009/0244013 A1 | 10/2009 | Eldershaw | |
| 2009/0259855 A1 | 10/2009 | de Cesare et al. | |
| 2009/0313693 A1 | 12/2009 | Rogers | |
| 2010/0013762 A1 | 1/2010 | Zontrop et al. | |
| 2010/0031200 A1 | 2/2010 | Chen | |
| 2010/0043062 A1 | 2/2010 | Alexander et al. | |
| 2010/0128002 A1 | 5/2010 | Stacy et al. | |
| 2010/0131294 A1 | 5/2010 | Venon et al. | |
| 2010/0156843 A1 | 6/2010 | Paleczny et al. | |
| 2010/0180336 A1 * | 7/2010 | Jones et al. | 726/19 |
| 2010/0186074 A1 | 7/2010 | Stavrou et al. | |
| 2010/0211551 A1 | 8/2010 | Ryu | |
| 2010/0223276 A1 | 9/2010 | Al-Shameri et al. | |
| 2010/0250937 A1 | 9/2010 | Blomquist et al. | |
| 2010/0322485 A1 | 12/2010 | Riddiford | |
| 2010/0325721 A1 | 12/2010 | Bandyopadhyay et al. | |
| 2010/0328201 A1 | 12/2010 | Marvit et al. | |
| 2011/0016405 A1 | 1/2011 | Grob et al. | |
| 2011/0031139 A1 | 2/2011 | Macor | |
| 2011/0156867 A1 | 6/2011 | Carrizo et al. | |
| 2011/0197259 A1 | 8/2011 | Thibadeau et al. | |
| 2011/0247067 A1 | 10/2011 | Hirose | |
| 2012/0123920 A1 | 5/2012 | Fraser et al. | |
| 2012/0126940 A1 | 5/2012 | Coggill | |
| 2012/0166944 A1 | 6/2012 | Cotterill | |
| 2012/0304284 A1 | 11/2012 | Johnson et al. | |
| 2013/0047252 A1 | 2/2013 | Johnson et al. | |

FOREIGN PATENT DOCUMENTS

| | | |
|---|---|---|
| CN | 201569981 | 9/2010 |
| CN | 201821481 | 5/2011 |
| DE | 10024179 | 11/2001 |
| EP | 2150915 | 10/2010 |
| EP | 2466513 | 6/2012 |
| EP | 2466518 | 6/2012 |
| KR | 100856919 | 9/2008 |
| KR | 20110044131 | 4/2011 |
| TW | 201026004 | 7/2010 |
| WO | WO177792 | 10/2001 |
| WO | WO-03048909 | 6/2003 |
| WO | WO-2009022242 | 2/2009 |
| WO | WO 2009022242 A1 * | 2/2009 |
| WO | WO-2011100017 | 8/2011 |

OTHER PUBLICATIONS

"Notice of Allowance", U.S. Appl. No. 13/409,877, (Aug. 30, 2013), 8 pages.

"First Examination Report", NZ Application No. 618124, May 14, 2014, 2 pages.

"Foreign Notice of Allowance", NZ Application No. 618124, Aug. 22, 2014, 1 page.

"Notice of Allowance", U.S. Appl. No. 13/656,594, Jul. 30, 2014, 10 pages.

"Advisory Action", U.S. Appl. No. 12/485,952, (Oct. 12, 2012), 3 pages.

"Drawing Passwords", IBM Technical Disclosure Bulletin, *International Business Machines Corp*, vol. 40, No.5,, (May 1, 1997), pp. 201-203.

"Extended European Search Report", EP Application No. 09711593, (Jun. 9, 2011), 7 pages.

"Final Office Action", U.S. Appl. No. 10/187,311, (May 1, 2006), 21 pages.

"Final Office Action", U.S. Appl. No. 11/073,742, (Mar. 25, 2010), 14 pages.

"Final Office Action", U.S. Appl. No. 11/073,742, (May 12, 2009), 17 pages.

(56) References Cited

OTHER PUBLICATIONS

"Final Office Action", U.S. Appl. No. 12/485,952, (Jul. 24, 2012), 22 pages.
"Final Office Action", U.S. Appl. No. 13/163,201, (May 2, 2013), 32 pages.
"Final Office Action", U.S. Appl. No. 13/409,877, (Jan. 23, 2013), 7 pages.
"Final Office Action", U.S. Appl. No. 13/656,594, (May 30, 2013),19 pages.
"Foreign Notice of Allowance", Application No. 2011202415, (Mar. 28, 2012), 3 pages.
"Foreign Notice of Allowance", EP Application No. 09711593.5, (Aug. 6, 2012), 8 pages.
"Foreign Office Action", Australian Application No. 2011202415, (Feb. 22, 2012),1 page.
"Foreign Office Action", Australian Application No. 2011202415, (Nov. 24, 2011), 2 pages.
"International Search Report", Application No. PCT/US2009/032771, (Aug. 27, 2009), 3 pages.
"International Search Report", PCT Application No. PCT/US10/58825, (Feb. 2, 2011), 1 page.
"International Search Report",PCT Application No. PCT/US2011/055507, (Apr. 10, 2012), 9 pages.
"Non-Final Office Action", U.S. Appl. No. 10/187,311, (Oct. 17, 2006), 19 pages.
"Non-Final Office Action", U.S. Appl. No. 10/187,311, (Nov. 7, 2005), 17 pages.
"Non-Final Office Action", U.S. Appl. No. 11/073,742, (Aug. 25, 2010), 14 pages.
"Non-Final Office Action", U.S. Appl. No. 11/073,742, (Oct. 14, 2009), 14 pages.
"Non-Final Office Action", U.S. Appl. No. 11/073,742, (Oct. 16, 2008), 15 pages.
"Non-Final Office Action", U.S. Appl. No. 11/775,159, (Jul. 23, 2009), 17 pages.
"Non-Final Office Action", U.S. Appl. No. 11/775,159, (Dec. 18, 2008), 16 pages.
"Non-Final Office Action", U.S. Appl. No. 12/034,254, (Dec. 22, 2010), 11 pages.
"Non-Final Office Action", U.S. Appl. No. 12/485,952, (Dec. 01, 2011), 14 pages.
"Non-Final Office Action", U.S. Appl. No. 13/163,201, (Oct. 10, 2012), 28 pages.
"Non-Final Office Action", U.S. Appl. No. 13/409,877, (Aug. 1, 2012), 6 pages.
"Non-Final Office Action", U.S. Appl. No. 13/656,594, (Jan. 4, 2013), 16 pages.
"Notice of Allowance", U.S. Appl. No. 10/187,311, (Mar. 1, 2007), 7 pages.
"Notice of Allowance", U.S. Appl. No. 11/073,742, (Feb. 22, 2011), 12 pages.
"Notice of Allowance", U.S. Appl. No. 11/775,159, (Jan. 22, 2010), 8 pages.
"Notice of Allowance", U.S. Appl. No. 12/034,254, (Jul. 6, 2011), 11 pages.
"Notice of Allowance", U.S. Appl. No. 12/034,254, (Jul. 6, 2011), 10 pages.
"Notice of Allowance", U.S. Appl. No. 12/034,254, (Aug. 18, 2011), 13 pages.
"Notice of Allowance", U.S. Appl. No. 12/485,952, (Feb. 1, 2013), 6 pages.
"Notice of Allowance", U.S. Appl. No. 12/485,952, (Nov. 29, 2012), 6 pages.
"Restriction Requirement", U.S. Appl. No. 12/485,952, (Sep. 2, 2011), 5 pages.
"Supplemental Notice of Allowance", U.S. Appl. No. 12/034,254, (Aug. 18, 2011), 10 pages.
"Ultra-Mobile PC Your life. At the touch of your finger.", Retrieved at <http://www.microsoft.com/windows/products/winfamily/umpc/default.mspx> on Mar. 25, 2011, 1 page.
"Written Opinion", Application No. PCT/US2009/032771, (Aug. 20, 2010), 3 pages.
Angeli, et al., "Usability and User Authentication: Pictorial Passwords vs. Pin", Retrieved at <http://www.antonella_de_angeli._talktalk.neUfiles/Pdf/USABI_LITY%20AND%20U_SER%20AUTHENTICATION%20PICTORIAL%20PASSWORDS%20VS%20PIN.pdf>, (2003), 6 pages.
Ballard, "Generalizing the hough transform to detect arbitrary shapes", *Pattern Recognition*, vol. 13, No. 2, (1981), pp. 111-122.
Bishop, et al., "Improving System Security via Proactive Password Checking", *Computers and Security*, vol. 14, No. 3, (1995), pp. 233-249.
Brostoff, "Are Passfaces More Usable than Passwords a Field Trial Investigation", *SIGSAC ACM Special Interest D Group on Securit, Audit and Control*, (2001), 20 pages.
Chalkias, et al., "Multi-Grid Graphical Password Scheme", *Proceedings of the 6th International Conference on Artificial Intelligence and Digital Communications (AIDC)*, 2006, pp. 81-90.
Curtis, et al., "Computer Generated Watercolor", *SIGGRAPH '97*, Los Angeles, CA, (Aug. 1997), 10 pages.
De Angeli, et al., "Is a Picture Really Worth a Thousand Words? Exploring the Feasibility of Graphical Authentication Systems", *International. Journal of Human-Computer Studies*, (2005), 34 pages.
Dhamija, Rachna "Hash Visualization in User Authentication", *Proceedings of the Computer Human Interaction 2000 Conference*, (Apr. 2000), 2 pages.
Dhamija, Rachna et al., "Deja Vu: A User Study Using Images for Authentication", *9th USENIX security symposium*, (2000),14 pages.
Diaz, et al., "A Comparative Evaluation of Finger-Drawn Graphical Password Verification Methods", *2010 12th International Conference on Frontiers in Handwriting Recognition*, (2010), 6 pages.
Dirik, et al., "Modeling User Choice in the PassPoints Graphical Password Scheme", *ACM, Symposium on Usable Privacy and Security (SOUPS)*, (Jul. 2007), 9 pages.
Doja, et al., "Virtual Password: Virtual Environment Based User Authentication", Retrieved at <http://nguyendangbinh.org/Proceedings/IPCV08/Papers/SAM4029.pdf>, (Jul. 14-17, 2008), 6 pages.
Du, et al., "A Scalable Integrated Region-Based Image Retrieval System", 0-7803-6725-1 *IEEE*, Available at <http://ieeexplore.ieee.org/xpl/login.jsp?tp=&arnumber=958943&url=http%3A%2F%2Fieeexplore.ieee.org%2Fxpls%2Fabs_all.jsp%3Farnumber%3D958943>,(2001), 4 pages.
Feldmeier, David et al., "UNIX Password Security Ten Years Later", Proceedings of Crypto'89, published as Lecture Notes in Computer Science, No. 435, *Springer Verlag*, (1989), 20 pages.
Hoff, Kenneth E., et al., "Fast Computation of Generalized Voronoi Diagrams Using Graphics Hardware", *ACM* (1999), 10 pages.
Jansen, et al., "Picture Password: A Visual Login Technique for Mobile Devices", Retrieved at <http://csrc.nist.gov/publications/nistir/nistir-7030.pdf>, (Jul. 2003), 20 pages.
Jansen, Wayne "Authenticating Mobile Device Users Through Image Selection", Retrieved at <http://csrc.nist.gov/_groups/SN_S/mobile_security/documents/mobile_devices/PP-VisualAuthentication-rev-D504._pdf>, (May 2004), 10 pages.
Jermyn, et al., "The Design and Analysis of Graphical Passwords", *Proceedings of the 8th USENIX Security Symposium*, Washington, D.C., USA, Retrieved at <http://www.usenix.org/events/sec99/full_papers/jermyn/jermyn.pdf>,(Aug. 23, 1999-Aug. 26, 1999), 15 pages.
Juels, Ari "At the Juncture of Cryptography and Humanity", *RSA Laboratories*, (2002), pp. 1-4
Kara, et al., "Hierarchical Parsing and Recognition of Hand-Sketched Diagrams", *In UIST '04: Proceedings of the 17th Annual ACM Symposium on User Interface Software and Technology*, (2004), 10 pages.
Khandelwal, et al., "User Authentication by Secured Graphical Password Implementation", Retrieved at <http://ieeexplore.ieee.org/xpl/freeabs_all.jsp?arnumber=4653531>, (Nov. 25, 2010), pp. 100-104.
Klein, "Foiling the Cracker a Survey of and Improvements to, Password Security", *Proceedings of the Second USENIX Security Workshop*, (Aug. 2, 1990), 11 pages.
Lipton, "Logical Authentication Methods", (1986), pp. 9-20.

(56) References Cited

OTHER PUBLICATIONS

Morris, Robert et al., "Password Security a Case History", *Communications of the AcCM*, vol. 22, No. 11, (Nov. 1979), pp. 594-597.
Nali, et al., "Analyzing User Choice in Graphical Passwords", <<http://www.scs.carleton.ca/research/5_tech_reports/2004/TR-04-01.pdf>> Technical Report, *School of Information Technology an D Engineering*, Univ of Ottawa, Canada, (May 27, 2004), 6 pages.
Naveen, Sundar G., et al., "Password Management Using Doodles", *ICMI 2007 Proceedings of the 9th International Conference on Multimodal Interfaces*, (Nov. 15, 2007), 5 pages.
Oka, "A New Cellular Automaton Structure for Macroscopic Linear-Curved Features Extraction", *Proceedings of the 4th International Joint Conference on Pattern Recognition*, Kyoto, Japan, (1978), pp. 654-656.
Oka, et al., "Scribble-a-Secret: Similarity-Based Password Authentication Using Sketches", *19th International Conference on Pattern Recognition*, 2008, Retrieved at <http://figmenl.cse.usf.edu/-sfefilal/data/papers/ThAT9.40.pdf>,(2008), 4 pages.
Paulson, Linda D., "Taking a Graphical Approach to the Password", *News Briefs*, (Jul. 2002), 1 page.
Perlin, "An Image Synthesizer", *Computer Graphics*, vol. 19, No. 3, (Jul. 1985), pp. 287-296.
Perra, C "A Framework for Image Based Authentication", Retrieved at <<http://ieeexplore.ieee.org/stamp/stamp.jsp?tp=&arnumber=1415456&isnumber=30651>>, *Proceedings of the IEEE International Conference on Acoustics, Speech and Signal Processing*, vol. 2, (Mar. 2005), pp. 521-524.
Perrig, et al., "Hash Visualization a New Technique to Improve Real World Security", *Proceedings of the 1999 International Workshop on Cryptographic Techniques and E Commerce*, (1999), pp. 131-138.
Sobrado, Leonardo et al., "Graphical Passwords", (2002),8 pages.
Sun, et al., "An Interactive and Secure User Authentication Scheme for Mobile Devices", Retrieved at <http://ieeexplore.ieee.org/xpl/freeabs_all.jsp?arnumber=4542082>, IEEE International Symposium on Circuits and D Systems,(May 2008), pp. 2973-2976.
Suo, et al., "Graphical Passwords: A Survey", found at <<http://www.acsa-admin.org/2005/papers/89.pdf>>, *21st Annual Computer Security Applications Coni (ACSA05)*, (2005), 10 pages.
Takada, Tetsuji et al., "Awase-E: Image-based Authentication for Mobile Phones using User's Favorite Images", Retrieved at: <<http://www.netaro.info/-zetaka/publications/papers/awasee-MobileHCI03.pdf>>, *Proceedings of 5th International Symposium on Human Computer Interaction with Mobile Devices and Services(Mobile HCI 03)*, (Sep. 2003), 5 pages.
Varenhorst, "Passdoodles: a Lightweight Authentication Method", retrieved from the internet on May 25, 2011 at <<http://people.csail.mil.edu/emax/papers/varenhorst.pdf>>, (May 15, 2005), 14 pages.
Venkatesan, R et al., "Robust Image Hashing", *IEEE 2000*, (2000),3 pages.
Wang, et al., "SIMPLIcity: Semantics-Sensitive Integrated Matching for Picture Libraries", *IEEE Transactions on Pattern Analysis and Machine Intelligence*, vol. 23, No. 9, <http://ieeexplore.ieee.org/xpl/login.jsp?tp=&arnumber=955109&url=http%3A%2F%2Fieeexplore.ieee.org%2Fiel5%2F34%2F20661%2F00955109.pdf%3Farnumber%3D955109>,(Sep. 2001), 17 pages.
Wertheimer, "Laws of Organization in Perceptual Forms", A Source Book of Gestait Psychology, Chapter 5, *Routledqe and Kegan Paul Ltd.*, (1938), pp. 71-88.
Wiedenbeck, et al., "Authentication Using Graphical Passwords: Effects of Tolerance and Image Choice", found at 8 <<http://www.gbtn.org/-chlee/research/phishing/p1-wiedenbeck.pdf>>,*Symposium on Usable Privacy and Security D (SOUPS)*, (Jul. 2005), 12 pages.
Wood, et al., "The Rorschach Inkblot Test: A Case of Overstatement", *Assessment*, vol. 6, No. 4, pp. 341-351.
Yan, Jianxin et al., "The memorability and security of passwords—some empirical results", Technical Report, University of Cambridge, *Computer Laboratory*, (Sep. 2000), 13 pages.
Yan, Jianzin J., "A Note on Proactive Password Checking", *ACM* (2002), 9 pages.
"Supplemental Notice of Allowance", U.S. Appl. No. 13/163,201, Nov. 26, 2013, 12 pages.
"Non-Final Office Action", U.S. Appl. No. 13/656,594, Apr. 23, 2014, 23 pages.
"Corrected Notice of Allowance", U.S. Appl. No. 13/656,594, Nov. 13, 2014, 2 pages.
"Foreign Office Action", CO Application No. 13-299.227, Sep. 24, 2014, 11 pages.
"Non-Final Office Action", U.S. Appl. No. 14/156,044, Nov. 18, 2014, 23 pages.
"Final Office Action", U.S. Appl. No. 14/156,044, Apr. 3, 2015, 20 pages.
"Foreign Office Action", CN Application No. 201180071045.2, May 25, 2015, 17 pages.
"Non-Final Office Action", U.S. Appl. No. 14/156,044, Sep. 30, 2015, 20 pages.
"Foreign Office Action", TW Application No. 101/118546, Nov. 30, 2015, 9 Pages.

\* cited by examiner

IMAGE-BASED UNLOCK FUNCTIONALITY ON A COMPUTING DEVICE

RELATED APPLICATIONS

This application is a divisional of and claims priority to U.S. patent application Ser. No. 12/485,952 filed Jun. 17, 2009, the disclosure of which is incorporated by reference herein in its entirety.

BACKGROUND

Touch screens are known to provide a means for displaying graphics and text in electronic devices and for entering commands to control the device or to perform various other functions to carry out the operation of the device. Touch screens are now becoming increasingly popular for use as displays in mobile telephones, particularly cellular telephones having integrated personal digital assistant (PDA) or palm-held personal computer (PPC) features. The touch screens are generally designed to operate and respond to a finger touch, a stylus tap or movement on the touch screen surface. Touching or tapping a specific point on the touch screen display activates a virtual button, feature or function found or shown at that location on the touch screen display. Typical telephone features which may be operated by touching or tapping the touch screen display include entering a telephone number, for example, by tapping or touching virtual keys of a virtual keyboard shown on the display, making a call or ending a call, navigating through an address book, increasing or decreasing the listening volume, starting or ending a call, accessing speed dialing, and locking/unlocking the telephone.

Currently, mobile phones provide security against unauthorized use by requiring a user to enter a password such as a text string or a personal identification number (PIN) using a keypad on the mobile telephone. The mobile telephone is locked against use until the user enters the correct password. In order to maximize security, the mobile telephone may require the user to enter the password every time the mobile telephone is used. In practice, for the sake of convenience and ease of remembering, users often select weak passwords (e.g., passwords that are predictable, such as a birth date). The more predictable a password may be, the easier it is for an unauthorized user to determine the password. However, the more strong a password is (e.g., a longer password), the more difficult it is for an authorized user to remember the password. Existing systems for locking computing devices fail to encourage users to select strong passwords while also providing an engaging unlock experience.

SUMMARY

Embodiments of the disclosure present an image to a user on a computing device. The image serves as a template for locking and unlocking the computing device and includes a plurality of portions that are defined, and thereafter, identified to the user as selectable portions. A user's selection of the portions of the image is received and stored as an unlock code for subsequently unlocking the computing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the disclosure described herein relate to lock and unlock capabilities of a computing device. For example, aspects of the disclosure include a touch screen 304 on a mobile computing device 102. In embodiments of the disclosure, functions of mobile computing device 102 are selectable by tapping or touching touch screen 304 by means of, for example, a stylus or a user's finger. Embodiments of the disclosure use an image, such as a photograph as a basis for a "key combination" in contrast to conventional systems and methods that utilize numeric or alphanumeric personal identification numbers (PINS) (e.g., four or six digit PINs). For example, a user selects portions or zones of an image in a pre-defined sequence. This sequence is stored as an unlock code. Thus, the unlock function on the mobile computing device 102 may be personalized thereby enhancing the user unlock experience while maintaining or increasing the security of the mobile computing device 102. In some embodiments, it is more difficult for an unauthorized user to gain access to the mobile computing device 102 locked in accordance with the disclosure than it would be if the mobile computing device 102 is locked in accordance with conventional lock functionality such as, for example, a 10-digit PIN.

The user may select an image to serve as a template for unlocking the mobile computing device 102. After the user selects an image to be displayed on the mobile computing device 102, the user selects portions or zones of the image in a specified sequence. The portions or zones, along with the specified sequence, are stored as an unlock code. Thus, when the user wants to unlock the mobile computing device 102, the selected image is displayed on the mobile computing device 102. The user selects the portions or zones in the image (e.g., contacts the portions or zones via the touch screen 304) in the selected sequence to unlock the mobile computing device 102. As described herein, utilizing the image as a reference for the unlock code not only provides a user with an interactive, fun, and personalized method of locking and/or unlocking the mobile computing device 102, but also provides security based at least on the quantity of portions or zones within an image that may be selected. In some embodiments, the quantity of portions within the image may be defined by identified contours or edges of objects within the image. For example, the touch screen 304 may have a predefined grid allowing selection of an image within one of the portions of the grid (see FIG. 4 and FIG. 5).

In addition, unlike conventional systems and methods, the user may lock the mobile computing device 102 while an application is in progress without disrupting the execution of the running application. For example, if the user is listening to music on the mobile computing device 102, the user locks the mobile computing device 102 while continuing to listen to the music. This allows the user to, for example, listen to uninterrupted music while exercising without accidentally disrupting play of the music because the user does not have to worry about accidental initiation of other applications from unintentional touching of the device. In a further example, a user may initiate a global positioning system (GPS) application to provide the user with directions to a particular location. In this example, the user may lock the mobile computing device 102 while the GPS application is providing directions. Thus, the user does not have to worry about accidental initiation of other applications from unintentional touching of the device while the directions are being provided by the GPS application.

While some embodiments of the disclosure are illustrated and described herein with reference to mobile computing device 102 such as a mobile telephone, aspects of the disclosure are operable with any device that performs the functionality illustrated and described herein, or its equivalent. For example, embodiments of the disclosure are operable with netbooks, desktop computing devices, laptop computers, gaming consoles, portable audio players, and other devices.

Aspects of the disclosure described herein provide, at least, an intuitive, enjoyable, and memorable lock functionality for any computing device. In embodiments, the lock screen appears because of an explicit user command to lock the device, or because of powering on the device.

Referring again to FIG. 1, an exemplary block diagram illustrates the mobile computing device 102 having a memory area 104 for storing components for controlling access to mobile computing device 102. Mobile computing device 102 further includes a display 106 and at least one processor 108. Display 106 may be, for example, a capacitive touch screen display such as touch screen 304. User input functionality is provided in display 106 which acts as a user input selection device. Display 106 is configured to be responsive to a user pressing contact on display 106 to selectively perform functionality. Thus, a user can operate the desired phone functions available with mobile computing device 102 by contacting a surface of display 106 as well as other functions provided herein.

Figure 1:
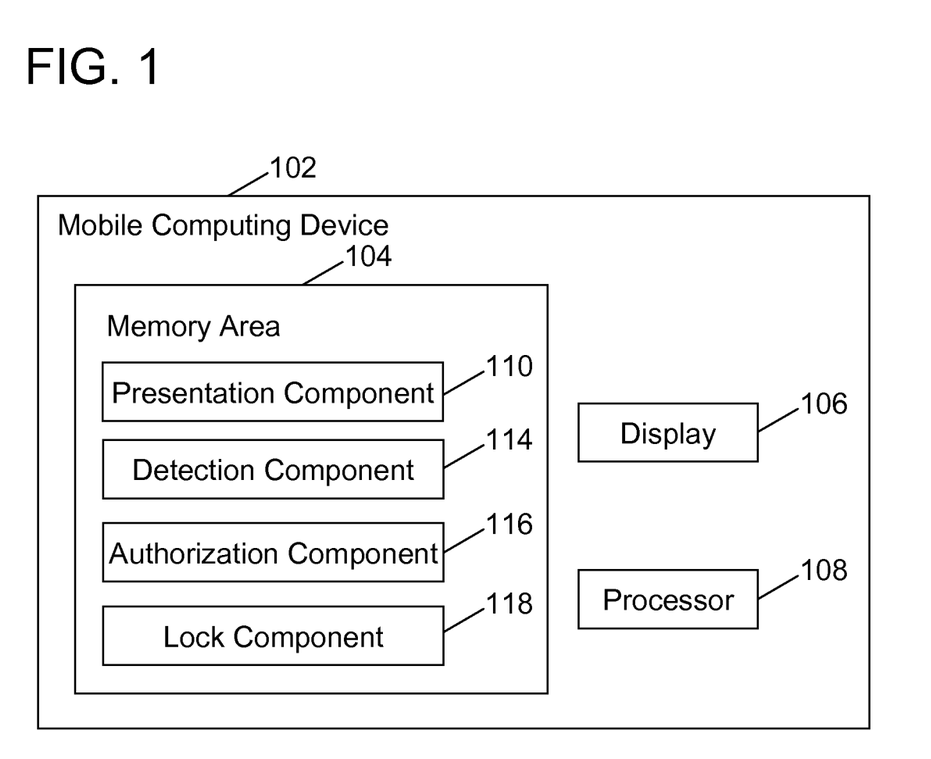
FIG. 1 is an exemplary block diagram of a mobile computing device having a memory area storing components for unlocking the mobile computing device.

Memory area 104, or other computer-readable medium or media, stores, for example, user-defined or default images and unlock codes. However, while images and unlock codes are stored in the memory area 104 on mobile computing device 102, one or more of the images and unlock codes may be stored remotely from mobile computing device 102. For example, images and unlock codes may be stored in a cloud service, a database, or other memory area accessible by mobile computing device 102.

Memory area 104 further stores one or more computer-executable components. Exemplary components include, but are not limited to, a presentation component 110, a detection component 114, an authorization component 116, and a lock component 118. While the components are shown to be stored in memory area 104, the components may be stored and executed from a memory area remote from mobile computing device 102. For example, the components may be stored by a cloud service, and the output of the execution of the components may be provided to mobile computing device 102. Such embodiments reduce the computational and storage burden on mobile computing device 102. The components illustrated in FIG. 1 are described below with reference to FIG. 5.

Figure 5:
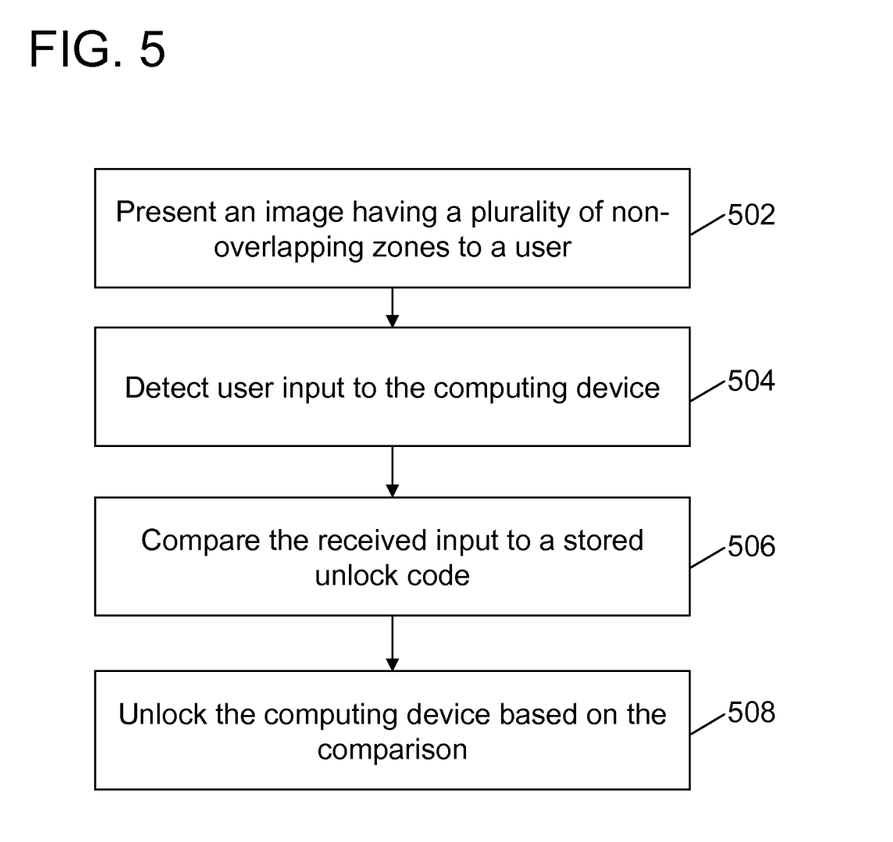
FIG. 5 is an exemplary flow chart illustrating the unlocking of a mobile computing device.

Processor 108 executes computer-executable instructions for implementing aspects of the disclosure. In some embodiments, the processor 108 is transformed into a special purpose microprocessor by executing computer-executable instructions or by otherwise being programmed. For example, the processor 108 is programmed with instructions such as illustrated in FIG. 2 and FIG. 5.

Figure 2:
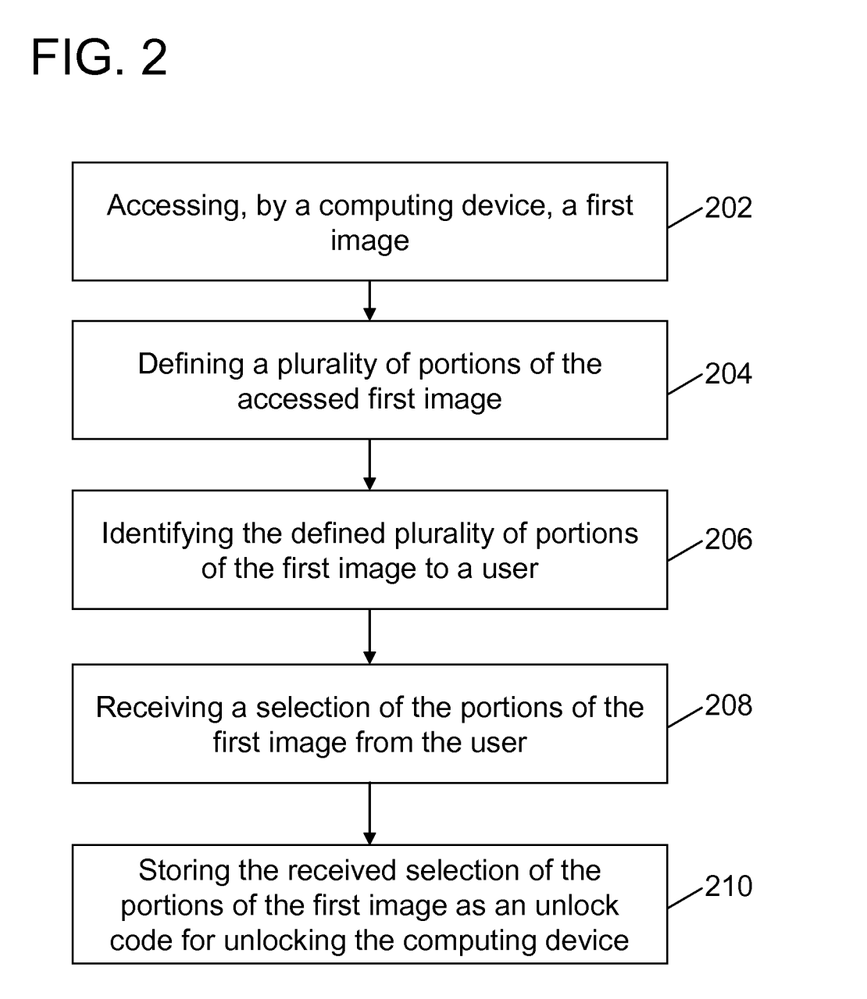
FIG. 2 is an exemplary flow chart illustrating a process for defining an unlock code for the mobile computing device.

Referring next to FIG. 2, an exemplary flow chart illustrates the creation of an unlock code. At 202, a computing device accesses one or more images (e.g., photographs) stored in memory area 104. The images may be user-defined images or default images. At 204, a plurality of portions (e.g., non-overlapping zones) of the image is defined. For example, the accessed image is divided into a plurality of the non-overlapping portions or zones. The portion may be defined by overlaying the image with a grid, outlining features within the image, performing edge detection, processing an image to identify features, and the like. The computing device may also detect whether the selected image includes appropriate portions. For example, an image of a circle may not have enough portions for selection. In this example, an error message may be presented to a user, or a particular rating may be given to the image that identifies the image as a high security risk or a poor/weak image. In this embodiment, the more portions/zones an image has, the stronger the image is, and therefore, the lower a security risk the image is. Aspects of the disclosure may also reject an image that is identified to be below a pre-defined security threshold level.

At 206, the plurality of portions are identified or presented to a user via the display 106. In an embodiment, the defined portions may be highlighted, for example, via a color, shading, or circled, to distinguish the defined portions of the image from the non-defined portions. In embodiments, the defined portions of an image are the only selectable areas of the image. In a further embodiment, the defined portions of an image are merely recommended selectable areas of the image.

At 208, a selection of the portions is received from the user via display 106. For example, a user selects portions/zones within the image in a specified sequence. The user may use more than one image as well as a movement of the mobile computing device 102 as part of the unlock code. At 210, the received selections are stored in the memory area 104 as the unlock code. The unlock code may be subsequently modified by the user. Further, other unlock codes may be created that represent additional or alternative accepted codes for unlocking the device. For example, there may be different levels of unlock functionality. In some embodiments, one unlock code may expose a portion of the functionality of the mobile computing device 102, while another unlock code exposes the full functionality of the mobile computing device 102. In a particular example, one unlock code may enable a user to make calls or send instant messages, but prevent access to corporate emails. Another unlock code enables access to corporate email in addition to the rest of the functionality of the device.

Figure 3:
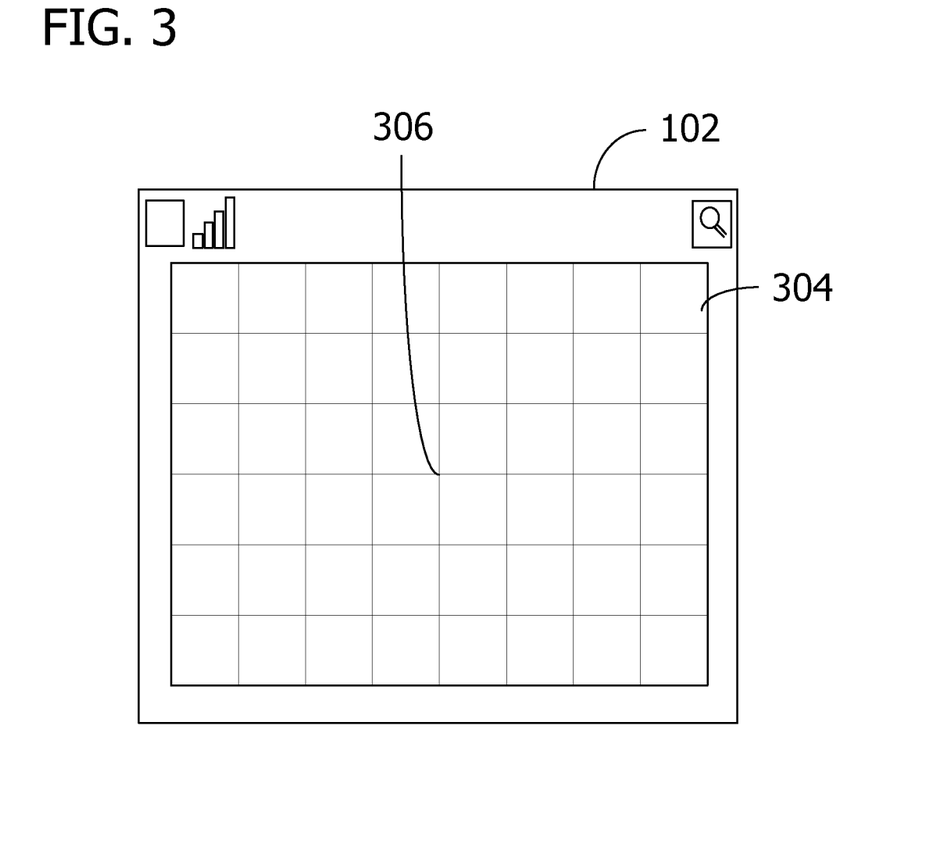
FIG. 3 is an exemplary block diagram illustrating a detection grid having selectable areas on a touch screen associated with a mobile device.

Referring next to FIG. 3, an exemplary block diagram illustrates a detection grid 306 with selectable areas on touch screen 304 associated with mobile computing device 102. For clarity, no image is displayed in this example. Touch screen 304 includes forty-eight selectable areas that are defined by grid 306, and thus, a user is limited to selecting a combination of the forty-eight selectable areas defined by the grid 306.

Figure 4:
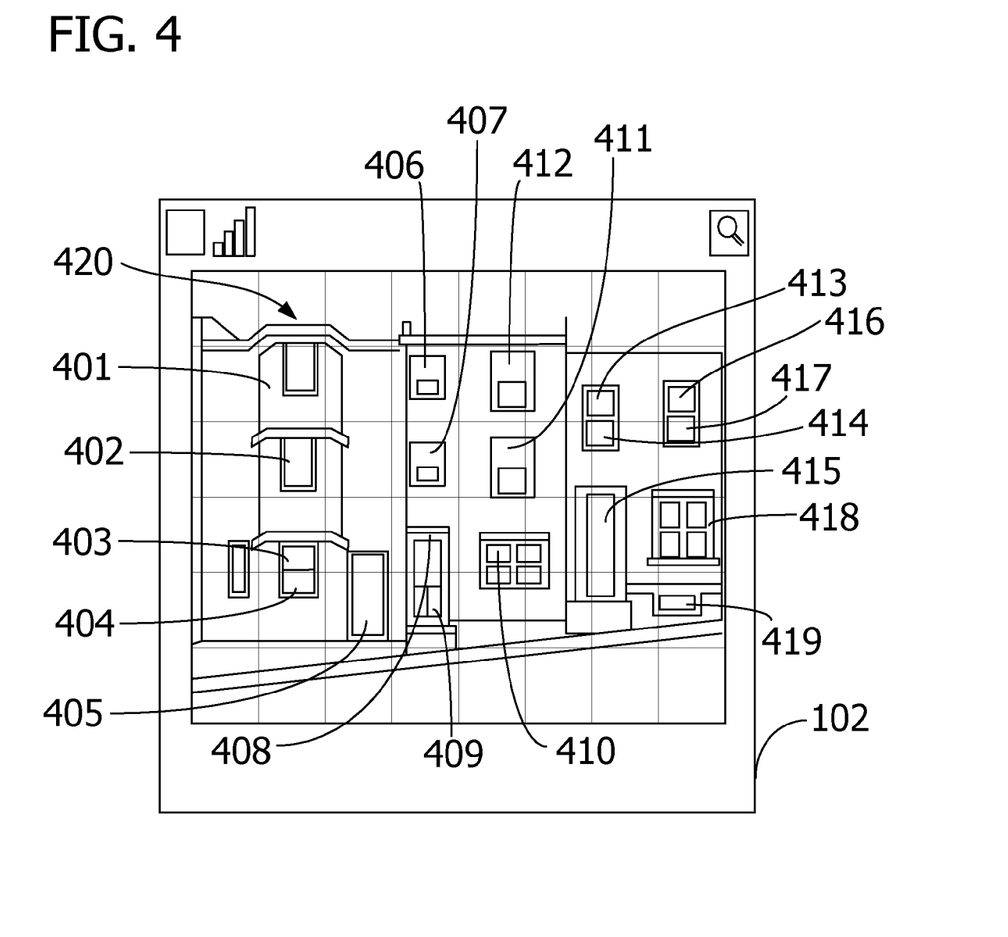
FIG. 4 is an exemplary block diagram illustrating a detection grid overlaid on an image to define selectable areas on a touch screen associated with a mobile device.

Referring next to FIG. 4, an exemplary block diagram illustrates an image 420 associated with a grid displayed on the mobile computing device 102. In this example, the user is able to select portions of the image 420 that correspond to the intersection of image 420 contours or edges and the selectable areas defined by grid. That is, the user is able to select portions of grid that include contours/edges of the image 420. As shown in FIG. 4, nineteen portions (e.g., portions 401-419) are defined as selectable portions within image 420. Thus, if a user decides to select portions 402, 404, 406, and 408 in that order, this order is stored as the unlock code for unlocking the mobile computing device 102. In an embodiment, the mobile computing device 102 may have a lower limit threshold of selections for the unlock code. For example, the user selects at least four defined portions in the image 420, at a minimum, to define the unlock code. For accelerometer-equipped devices, the lower limit threshold may also include a movement of the mobile computing device 102 as a selection. Thus, in this example, if the lower limit threshold includes four selections, the user selects portions/zones 402, 404, 406, as three of the four selections and rotates the mobile computing device 102 (e.g., counter clockwise 180 degrees) for the fourth selection.

Referring next to FIG. 5, an exemplary flow chart illustrates the unlocking of the mobile computing device 102. The operations illustrated in FIG. 5 are described with reference to the components from FIG. 1. The presentation component 110 presents one or more images on display 106 at 502. The image includes a user-defined image or a default image. The user selects portions or zones that are defined within the image in a specified sequence. In some embodiments, the user may select portions or zones defined from a plurality of images. For example, the user may select a defined zone from four separate images. In this embodiment, once a portion or zone is selected on a first image by the user, a second image is presented, and after a portion or zone is selected on the second image by the user, a third image is presented, etc. This process continues until the unlock code is established. In further embodiments, a user may select one portion from one image, and all the other portions from the other images. In still further embodiments, an image may act as a decoy during presentation such that no selection occurs from that particular image, and a user instructs the mobile computing device 102 to provide the user with the next image.

Detection component 114 detects the user input at 504 and receives the portion selections and sequence associated therewith or other operations from the user as input. The portion selections and sequence represent an attempt by the user to unlock the mobile computing device 102. In some embodiments, detection component 114 receives data from one or more interfaces or modules that receive the user input from the user. The interfaces may include, for example, touch screen 304 or other display generally such as display 106, or one or more accelerometers (e.g., one accelerometer for each axis of motion). For example, in some embodiments, the detection component 114 receives data from the accelerometers that corresponds to user-induced movement of the mobile computing device 102. The user-induced movement may represent a sequence of movements along at least one axis of rotation of the mobile computing device 102. The movements include, for example, rotating the mobile computing device 102 a number of degrees, shaking the mobile computing device 102 for a predetermined amount of time, or performing a sequence of movements of the mobile computing device 102. For compass-equipped mobile computing devices, the user may point the mobile computing device in a particular direction (e.g., north) or sequence of directions. In some embodiments, the movement or sequence of movements may correspond to part of the unlock code or constitute the entire unlock code.

In further embodiments, a movement or sequence of movements of the mobile computing device 102 may be combined with, or correspond to, a selection of a portion of a presented image. For example, an image of a combination lock having one or more reels is displayed to the user on the display 106. To unlock the mobile computing device 102, the user selects one of the reels (e.g., touches the display 106) and flicks the mobile computing device 102 or otherwise moves the mobile computing device 102 to rotate through digits on the selected reel of the combination lock. For example, when the mobile computing device 102 is rotated away from the user (e.g., at 180 degrees), the selected reel is similarly rotated (e.g., 180 degrees, or more or less) to simulate a manual rotation of the combination lock. The user performs similar operations to enter a combination to unlock the lock.

In some embodiments, the user selects and moves portion of the lock screen image to a different location within the image. For example, the image may include a plurality of scrambled pieces that the user unscrambles, or sorts, to unlock the mobile computing device 102. In such embodiments, not only does the user select particular portions of the image, but the user also places the portions in a particular location.

Authorization component 116 compares the data or operations received by the detection component 114 to a predefined sequence of the portions of the image at 506 to determine whether the user input corresponds to the unlock code. If the received operations match the stored unlock function, the lock component 118 unlocks the mobile computing device 102 at 508. Otherwise, the lock component 118 displays an error message to the user indicating that the input did not match the stored unlock code.

Figure 6:
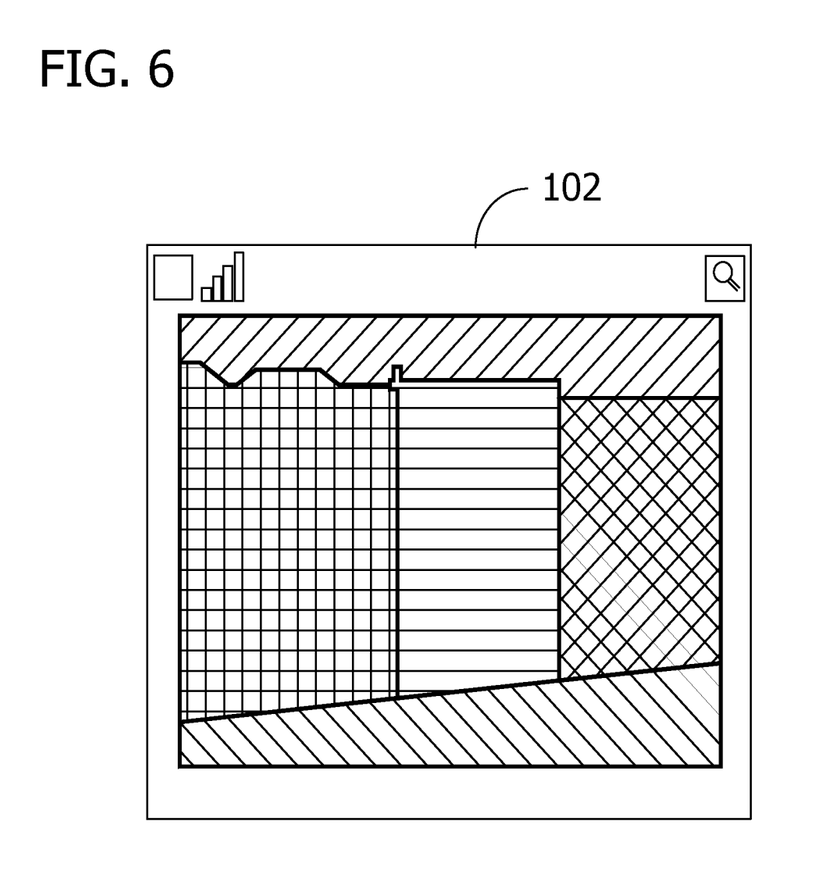
FIG. 6 is an exemplary block diagram illustrating areas of an image that represent selectable portions for the unlock code.

Referring next to FIG. 6, an exemplary block diagram illustrates areas of an image that are selectable by the user as the unlock code. In the example of FIG. 6, the image corresponds to the image from FIG. 4. In this example, each of the three buildings has been identified as a selectable zone, along with the sky and the ground as additional selectable zones. The user is able to select a sequence of the zones to define the unlock code.

In other embodiments, the portions or zones are defined by other areas of the image. For example, the selectable portions may correspond to windows in an image of a building, or faces in a family portrait. Aspects of the disclosure contemplate numerous other means for defining the selectable portions based on the image.

Additional Examples

Aspects of the disclosure may also be used as a human interactive proof (HIP) or other challenge meant to be easily solved by a human yet too difficult to be easily solved by a program such as a bot. In such embodiments, for example, an image is displayed on a computing device during creation of a user account. Instructions are displayed such as "Select the following portions of the image with the mouse or stylus in sequence: 1. The red ball, 2. The brown dog, 3. The boat, and 4. The red shutters on the house." The portions and/or sequence in the instructions may be chosen randomly by the computing device, and the instructions may be displayed in multiple languages to internationalize the challenge. If the user selects the portions of the image in the requested sequence, the challenge is satisfied and the user may continue to create the user account. If the user fails the challenge, the user is prevented from creating the user account. Embodiments such as those described herein represent challenges that are applicable in multiple countries in contrast to existing HIP challenges, for example, that visually distort an English word and request textual input of the word.

Exemplary Operating Environment

A computer or computing device such as described herein has one or more processors or processing units, system memory, and some form of computer readable media. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

The computer may operate in a networked environment using logical connections to one or more remote computers, such as a remote computer. Although described in connection with an exemplary computing system environment, embodiments of the disclosure are operational with numerous other general purpose or special purpose computing system environments or configurations. The computing system environment is not intended to suggest any limitation as to the scope of use or functionality of any aspect of the disclosure. Moreover, the computing system environment should not be interpreted as having any dependency or requirement relating to any one or combination of components illustrated in the exemplary operating environment. Examples of well known computing systems, environments, and/or configurations that may be suitable for use with aspects of the disclosure include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein. Aspects of the disclosure may also be practiced in distributed computing environments where tasks are performed by remote processing devices that are linked through a communications network. In a distributed computing environment, program modules may be located in both local and remote computer storage media including memory storage devices.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

The invention claimed is:

1. A system comprising:
one or more hardware processors; and
one or more computer-readable storage devices having program instructions stored thereon for execution by the one or more hardware processors, the program instructions having a plurality of components, the plurality of components including:
a presentation component that, responsive to execution by the one or more hardware processors, causes the one or more hardware processors to present an image to a user, the image including objects within the image and having non-overlapping zones defined through performance of contour or edge detection of the objects within the image, the contour or edge detection of the objects defining intersection of contours or edges of the objects within the image, the intersection of the contours or the edges of the objects effective to differentiate the objects within the image;
a detection component that, responsive to execution by the one or more hardware processors, causes the one or more hardware processors to receive one or more operations performed by the user, the operations including a sequenced selection of the non-overlapping zones;
an authorization component that, responsive to execution by the one or more hardware processors, causes the one or more hardware processors to compare the operations received by the detection component to a predefined sequence of the non-overlapping zones representing an unlock code; and
a lock component that, responsive to execution by the one or more hardware processors, causes the one or more hardware processors to unlock a computing device based on the comparison performed by the authorization component.

2. The system of claim 1, wherein the image is presented to the user while the computing device is locked.

3. The system of claim 1, wherein the presentation component presents multiple images to the user.

4. The system of claim 1, wherein the lock component causes the one or more hardware processors to unlock additional functions of the computing device based on the comparison performed by the authorization component.

5. The system of claim 1, wherein the instructions further implement a processing component configured to process the image to detect or define the contours or edges of the visual objects within the image.

6. The system of claim 1, wherein the non-overlapping zones defined by the intersection of contours or edges of visual objects within the image are irregular, non-rectangular, or arbitrary in shape or size.

7. The system of claim 1, wherein one of the components is further configured to detect whether the image includes sufficient non-overlapping zones to meet a minimum security threshold required for the unlock code.

8. The system of claim 1, wherein the objects within the image include a window, door, building, person, or face of a person.

9. The system of claim 1, wherein the image is a family portrait, and the objects are faces of persons in the family portrait.

10. The system of claim 1, wherein the image is of multiple buildings, and the objects include a window of one of the multiple buildings or one of the multiple buildings.

11. The system of claim 1, wherein the image is of multiple buildings, the objects include each of the multiple buildings, and the intersection of the contours or edges of the objects are the contours of edges of each of the multiple buildings.

12. A method comprising:
presenting an image, the image including objects within the image and having non-overlapping zones, the non-overlapping zones defined through performance of contour or edge detection of the objects within the image, the contour or edge detection of the objects defining intersection of contours or edges of the objects within the image, the intersection of the contours or the edges of the objects effective to differentiate the objects within the image;
receiving operations from a user, the operations including a sequenced selection of the non-overlapping zones of the image;
comparing the operations to a predefined sequence of the non-overlapping zones, the predefined sequence of the non-overlapping zones representing an unlock code; and
unlocking a computing device responsive to determining that the predefined sequence of the non-overlapping zones matches the sequenced selection of the non-overlapping zones.

13. The method of claim 12, wherein the predefined sequence is a first predefined sequence and further comprising comparing the operations to a second predefined sequence and, responsive to determining that the second predefined sequence matches the sequenced selection, unlocking additional functions of the computing device.

14. The method of claim 12, wherein the operations received from the user further include a user-induced movement or sequence of movements of the computing device and wherein unlocking the computing device is further responsive to determining that the user-induced movement or sequence of movements matches a predefined user-induced movement of the unlock code.

15. The method of claim 14, wherein the user-induced movement or sequence of movements rotates the computing device a number of degrees clockwise or counter-clockwise along at least one axis.

16. The method of claim 12, further comprising performing the contour or edge detection prior to presenting the image.

17. A computing device comprising:
a touch screen display;
one or more computer processors;
one or more computer-readable storage devices, the computer-readable storage devices having computer-executable program instructions stored thereon for execution by the one or more computer processors, the computer-executable program instructions to perform operations comprising:
presenting an image on the touch screen display, the image including objects within the image and having non-overlapping zones defined through performance of contour or edge detection of the objects within the image, the contour or edge detection of the objects defining intersection of contours or edges of the objects within the image, the intersection of the contours or the edges of the objects effective to differentiate the objects within the image;
receiving operations from a user, the operations including a sequenced selection of the non-overlapping zones of the image received through the touch screen display;
comparing the operations to a predefined sequence of the non-overlapping zones, the predefined sequence of the non-overlapping zones representing an unlock code; and
unlocking the computing device responsive to determining that the predefined sequence of the non-overlapping zones matches the sequenced selection of the non-overlapping zones.

18. The computing device of claim 17, wherein the predefined sequence is a first predefined sequence and further comprising comparing the operations to a second predefined sequence and, responsive to determining that the second predefined sequence matches the sequenced selection, unlocking additional functions of the computing device.

19. The computing device of claim 17, wherein the operations received from the user further include a user-induced movement or sequence of movements of the computing device and wherein unlocking the computing device is further responsive to determining that the user-induced movement or sequence of movements matches a predefined user-induced movement of the unlock code.

20. The computing device of claim 19, wherein the user-induced movement or sequence of movements rotates the computing device along at least one axis a number of degrees and clockwise or counter-clockwise along the at least one axis.

* * * * *